US007698559B1

(12) United States Patent
Chaudhury et al.

(10) Patent No.: US 7,698,559 B1
(45) Date of Patent: *Apr. 13, 2010

(54) DYNAMIC ENABLING OF FUNCTIONALITY IN ELECTRONIC DOCUMENT READERS

(75) Inventors: Krish Chaudhury, Milpitas, CA (US); James D. Pravetz, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/865,712

(22) Filed: Oct. 1, 2007

Related U.S. Application Data

(63) Continuation of application No. 10/306,635, filed on Nov. 27, 2002, now Pat. No. 7,278,168.

(51) Int. Cl.
*G06F 21/24* (2006.01)
*H04L 9/32* (2006.01)
(52) U.S. Cl. .................. 713/176; 713/181; 726/27
(58) Field of Classification Search .............. None
See application file for complete search history.

(56) References Cited

U.S. PATENT DOCUMENTS

| 5,199,073 | A | 3/1993 | Scott |
| 5,204,897 | A | 4/1993 | Wyman |
| 5,226,159 | A | 7/1993 | Henson et al. |
| 5,260,999 | A | 11/1993 | Wyman |
| 5,341,429 | A | 8/1994 | Stringer et al. |
| 5,438,508 | A | 8/1995 | Wyman |
| 5,465,299 | A | 11/1995 | Matsumoto et al. |
| 5,509,070 | A | 4/1996 | Schull |
| 5,673,316 | A | 9/1997 | Auerbach et al. |
| 5,708,709 | A | 1/1998 | Rose |
| 5,745,879 | A | 4/1998 | Wyman |
| 5,765,152 | A | 6/1998 | Erickson |
| 5,787,175 | A * | 7/1998 | Carter .................. 713/165 |

(Continued)

FOREIGN PATENT DOCUMENTS

EP     0 565 314     10/1993

(Continued)

OTHER PUBLICATIONS

Adobe Systems Incorporated. "Adobe Acrobat 4.0 and Digital Signatures," Adobe Acrobat 4.0, Nov. 1999, pp. 1-4.

(Continued)

*Primary Examiner*—Christopher A Revak
(74) *Attorney, Agent, or Firm*—Fish & Richardson P.C.

(57) ABSTRACT

Methods and apparatus, including computer program products, implementing and using techniques for digital rights management. In one aspect, a method is provided. The method includes receiving an electronic document, where the electronic document includes one or more content items, a set of usage rights defining one or more features to be enabled when the document is read by an electronic document reader, and a stored representation. The method further includes generating a representation of invariant content items of the electronic document, comparing the generated representation with the stored representation, and enabling features corresponding to the set of usage rights in the electronic document only if the generated representation and the stored representation are identical, where the features are features performed by the electronic document reader on the electronic document.

24 Claims, 3 Drawing Sheets

U.S. PATENT DOCUMENTS

| | | | |
|---|---|---|---|
| 5,818,447 | A | 10/1998 | Wolf et al. |
| 5,892,904 | A | 4/1999 | Atkinson et al. |
| 5,912,974 | A | 6/1999 | Holloway et al. |
| 5,940,843 | A | 8/1999 | Zucknovich et al. |
| 6,076,166 | A | 6/2000 | Moshfeghi et al. |
| 6,154,757 | A | 11/2000 | Krause et al. |
| 6,249,794 | B1 | 6/2001 | Raman |
| 6,266,654 | B1 | 7/2001 | Schull |
| 6,282,552 | B1 | 8/2001 | Thompson et al. |
| 6,327,578 | B1 | 12/2001 | Linehan |
| 6,343,297 | B1 | 1/2002 | D'Anjou et al. |
| 6,357,004 | B1 | 3/2002 | Davis |
| 6,393,438 | B1 | 5/2002 | Kathrow et al. |
| 6,415,278 | B1 | 7/2002 | Sweet et al. |
| 6,529,905 | B1 | 3/2003 | Bray et al. |
| 6,532,541 | B1 | 3/2003 | Chang et al. |
| 6,671,805 | B1 * | 12/2003 | Brown et al. ............... 713/176 |
| 6,772,340 | B1 | 8/2004 | Peinado et al. |
| 6,775,655 | B1 | 8/2004 | Peinado et al. |
| 6,796,489 | B2 | 9/2004 | Slater |
| 6,824,051 | B2 | 11/2004 | Reddy et al. |
| 6,829,708 | B1 | 12/2004 | Peinado et al. |
| 6,848,048 | B1 | 1/2005 | Holmes |
| 6,876,984 | B2 | 4/2005 | Tadayon et al. |
| 6,895,503 | B2 | 5/2005 | Tadayon et al. |
| 6,970,866 | B1 | 11/2005 | Pravetz et al. |
| 6,973,445 | B2 | 12/2005 | Tadayon et al. |
| 6,973,618 | B2 | 12/2005 | Shaughnessy et al. |
| 7,010,750 | B2 | 3/2006 | Burky |
| 7,010,808 | B1 | 3/2006 | Leung et al. |
| 7,024,393 | B1 | 4/2006 | Peinado et al. |
| 7,031,943 | B1 | 4/2006 | James et al. |
| 7,051,005 | B1 | 5/2006 | Peinado et al. |
| 7,069,443 | B2 | 6/2006 | Berringer et al. |
| 7,130,445 | B2 * | 10/2006 | Ruhl et al. ............... 382/100 |
| 7,213,269 | B2 | 5/2007 | Orthlieb et al. |
| 7,240,205 | B2 * | 7/2007 | Greene et al. ............... 713/176 |
| 7,268,906 | B2 * | 9/2007 | Ruhl et al. ............... 358/1.15 |
| 7,278,168 | B1 * | 10/2007 | Chaudhury et al. ........... 726/30 |
| 7,302,576 | B2 * | 11/2007 | Greene et al. ............... 713/176 |
| 7,315,866 | B2 * | 1/2008 | Wu et al. ............... 707/102 |
| 7,315,947 | B2 | 1/2008 | Pravetz et al. |
| 7,353,398 | B2 * | 4/2008 | Kra ............... 713/181 |
| 2001/0034835 | A1 | 10/2001 | Smith |
| 2002/0002543 | A1 | 1/2002 | Spooren et al. |
| 2002/0013765 | A1 | 1/2002 | Schwartz |
| 2002/0019838 | A1 | 2/2002 | Petrogiannis |
| 2002/0029200 | A1 | 3/2002 | Dulin et al. |
| 2002/0042884 | A1 | 4/2002 | Wu et al. |
| 2002/0065848 | A1 | 5/2002 | Walker et al. |
| 2003/0014483 | A1 | 1/2003 | Stevenson et al. |
| 2003/0028774 | A1 | 2/2003 | Meka |
| 2003/0079175 | A1 | 4/2003 | Limantsev |
| 2003/0105816 | A1 | 6/2003 | Goswami |
| 2003/0145206 | A1 | 7/2003 | Wolosewicz et al. |
| 2003/0159035 | A1 | 8/2003 | Orthlieb et al. |
| 2003/0182402 | A1 | 9/2003 | Goodman |
| 2003/0217008 | A1 | 11/2003 | Habegger et al. |
| 2003/0221105 | A1 | 11/2003 | Bajaj |
| 2004/0054930 | A1 | 3/2004 | Walker et al. |
| 2004/0078394 | A1 | 4/2004 | Powell et al. |
| 2004/0117726 | A1 | 6/2004 | Inada et al. |
| 2004/0158731 | A1 | 8/2004 | Narin et al. |
| 2004/0181756 | A1 | 9/2004 | Berringer et al. |
| 2004/0230891 | A1 * | 11/2004 | Pravetz et al. ............... 715/511 |
| 2005/0058319 | A1 | 3/2005 | Rhoads et al. |
| 2008/0104406 | A1 | 5/2008 | Pravetz et al. |
| 2008/0177799 | A1 * | 7/2008 | Wilson ............... 707/200 |

FOREIGN PATENT DOCUMENTS

| | | |
|---|---|---|
| EP | 1 077 414 | 2/2001 |
| EP | 1 227 613 | 7/2002 |
| EP | 1398078 | 3/2004 |
| JP | 10-513289 | 12/1998 |
| WO | WO 00/54128 | 9/2000 |
| WO | WO 01/61508 | 8/2001 |
| WO | WO 03/007180 | 1/2003 |

OTHER PUBLICATIONS

Adobe Systems Incorporated. "Digitally Sign PDF Documents," Adobe Acrobat 5.0, 2001, pp. 1-3.

Bienz and Cohn, "Portable Document Format Reference Manual," Adobe Systems Incorporated, Addison-Wesley Publishing Company, 1993.

Chaudhury, et al. "Document Digest Allowing Selective Changes to a Document," U.S. Appl. No. 10/306,779, filed Nov. 27, 2002.

Chaudhury, et al. "Dynamic Enabling of Functionality in Electronic Document Readers," U.S. Appl. No. 10/306,635, filed Nov. 27, 2002.

Menezes, et al. "Handbook of Applied Cryptography," CRC Press, 1997, pp. 33 and 321-383.

Microsoft: "Online Help—Word disk" Feb. 6, 2001, pp. 1-6, IBN XP002310447.

Ortiz, Jr., S. "E-mail Protection Advances with New Technologies," Computer, vol. 33, No. 1 (Jan. 2000), pp. 21-23.

Rudin, C. "Editing a Macro with the Macro Recorder in: Rudin," Running Microsoft® Word 2000, 1999, Chapter 29, pp. 663-666.

Schneier, B. "Protocol Building Blocks," Applied Cryptography. Protocols, Algorithms, and Source Code in C, 1996, Chapter 2, pp. 34-44.

Simon, et al. "An Introduction to XML Digital Signatures," [online], [retrieved on Feb. 18, 2004]. Retrieved from the Internet: http://www.xml.com/pub/a/2001/08/08/xmldsig.html, 8 pages.

USPTO Non-Final Office Action in U.S. Appl. No. 10/440,487, mailed Feb. 10, 2009, 10 pages.

Microsoft Press "Editing a Macro with the Macro Recorder", Running Microsoft Word 2000, 1999, 6 pages.

Communication pursuant to Article 94(3) EPC for European Application No. 03 711 189.5-211, dated May 5, 2009, 4 pp.

Notice of Reason for Rejection, for Japanese Application No. 2003-571898, dated Jun. 30, 2009, 9 pages.

* cited by examiner

US 7,698,559 B1

DYNAMIC ENABLING OF FUNCTIONALITY IN ELECTRONIC DOCUMENT READERS

CROSS-REFERENCE TO RELATED APPLICATION

This application is a continuation application of, and claims priority to, U.S. patent application Ser. No. 10/306,635, entitled Dynamic Enabling of Functionality in Electronic Document Readers, to inventors Krish Chaudhury and James D. Pravetz, which was filed on Nov. 27, 2002, now U.S. Pat. No. 7,278,168. The disclosure of the above application is incorporated herein by reference in its entirety.

BACKGROUND

The present invention relates to digital rights management. Software applications for reading or writing electronic documents often come in multiple versions. A cheap or free version of the software application with limited functionality can be used to view electronic documents, for example, on a computer screen. One example of such a free software application is the Adobe® Acrobat® Reader®, manufactured by Adobe Systems Incorporated, San Jose, Calif., which allows a user to read PDF (Portable Document Format) documents.

In addition to the limited functionality software, the same vendor may also provide a feature-rich premium version that allows users to create and manipulate electronic documents in ways that are not provided in the limited functionality version. For example, the Adobe® Acrobat® application also manufactured by Adobe Systems Incorporated, allows a user to work with PDF documents and perform operations such as filling in and saving a form, digitally signing a form field, adding comments, and performing other operations. Currently, the only way for a document user to access these types of features is to buy the premium version of the software.

SUMMARY

In general, in one aspect, this invention provides methods and apparatus, including computer program products, implementing and using techniques for digital rights management. An electronic document containing one or more content items is provided along with a set of usage rights. The set of usage rights defines one or more features to be enabled when the electronic document is processed in an electronic document reader. A representation of a set of content items of the electronic document that are invariant to operations of the features in the set of usage rights is generated, and a digital signature authorizing the set of usage rights is provided.

Advantageous implementations can include one or more of the following features. Generating a representation can include generating a selective digest of a set of content items of the electronic document that are invariant to operations of the features in the set of usage rights. The selective digest and the set of usage rights can be transmitted to an authorization server. The set of usage rights, the selective digest, and the digital signature can be added to the electronic document. The set of usage rights can identify one or more features allowing specific operations to be performed in the electronic document using the electronic document reader. The operations can include one or more of: digitally signing the electronic document, entering data into predefined fields of the electronic document, annotating the electronic document, saving field values, and saving the electronic document. The electronic document can be a Portable Document Format document and adding the set of usage rights can include adding the set of usage rights as a dictionary. The representation can be a digest calculated based on the set of usage rights of the electronic document.

In general, in one aspect, this invention provides methods and apparatus, including computer program products, implementing and using techniques for enabling one or more features in an electronic document reader. An electronic document is received. The electronic document includes one or more content items, a set of usage rights defining one or more features to be enabled when the document is read by an electronic document reader, and a stored representation. A representation of invariant content items of the electronic document is generated. The generated representation is compared with the stored representation and if the generated representation and the stored representation are identical, features corresponding to the set of usage rights in the electronic document are enabled.

Advantageous implementations can include one or more of the following features. The electronic document can contain a digital signature of the stored representation, and the digital signature can be verified. The set of usage rights can identify one or more features allowing specific operations to be performed on the electronic document using the electronic document reader. The operations can include one or more of digitally signing the electronic document, entering data into predefined fields of the electronic document, annotating the electronic document, saving field values, and saving the electronic document. The electronic document can be a Portable Document Format document and the set of usage rights can be represented as a dictionary. The representation can be based on content items of the electronic document that are invariant to operations of the features in the set of usage rights. The representation can be a hash calculated based on the invariant content items of the electronic document.

In general, in one aspect, this invention provides methods and apparatus, including computer program products, implementing and using techniques for digital rights management. A first electronic document including a set of rules, a first representation, and security information is distributed to a user. A second electronic document is received from the user. A second representation of the content associated with a set of content items of the second electronic document is generated. The first representation and the second representation are compared in order to compare the second electronic document and the first electronic document.

In general, in one aspect, this invention provides methods and apparatus, including computer program products, implementing and using techniques for an electronic document reader. The reader has means for receiving an electronic document containing one or more content items, a set of usage rights defining one or more features to be enabled when the electronic document is processed in an electronic document reader, and a stored representation. The reader also includes means for generating a representation that represents invariant content items of the electronic document. Finally, there are means for comparing the generated representation with the stored representation and means for enabling features corresponding to the set of usage rights in the electronic document if the generated representation and the stored representation are identical.

In general, in one aspect, this invention provides methods and apparatus, including computer program products, implementing an electronic document. The electronic document has one or more content items; a set of usage rights defining one or more features that are to be enabled when the electronic document is processed in an electronic document reader, each of the features having one or more associated operations; and a representation that identifies the content items of the electronic document that are invariant to operations of the features in the set of usage rights.

In general, in one aspect, this invention provides methods and apparatus, including computer program products, implementing and using techniques for digital rights management. An electronic document reader is provided to one or more users. A set of usage rights defining one or more features to be enabled when an electronic document is processed in the electronic document reader is received. A representation of content items of an electronic document is received. The content items are invariant to operations of the identified features. Use of the features in the set of usage rights and the representation is authorized and the authorized set of usage rights and the representation are transmitted back to a sender of the set of usage rights and the representation.

Advantageous implementations can include one or more of the following features. A payment can be collected based on the authorized set of usage rights. Authorizing can include signing the set of usage rights and the representation with a private digital key and the electronic document reader includes a public key corresponding to the private key.

Implementations of the invention can include one or more of the following advantageous features. A mechanism is provided with which an author or content provider can ensure that individual users can only make allowed changes to documents. This enables workflows in which the author of an electronic document can enable a particular set of features for a particular electronic document. One example of such a workflow might feature a government agency, such as the Internal Revenue Service (IRS), that would like to distribute forms (such as tax forms) electronically to a large number of recipients. To achieve a true paperless workflow, form recipients (such as taxpayers) need to access features that are typically only available in the premium version of the software. Rather than require all recipients to acquire the premium version of the software application, the agency can enable features of the premium software application in the free software application in a particular context, such as within a particular electronic document. At the same time, the agency has the ability to limit the ways in which users can make changes in the document—for example, by limiting the types of changes to those that are approved by the agency. The vendor can also implicitly control what operations can be performed by the free software application, for example, by charging the author different amounts for enabling different features or for enabling the same feature in different documents. The invention binds a particular instance of feature enablement to a specific electronic document. It makes it nearly impossible for a hacker to transfer the feature enablement from one document to another. It also nullifies the feature enablement if any alterations are made to the core content of the document. At the same time, the invention allows superficial changes (such as form fill-in and save, digital signature, addition of comments, etc.) to take place without affecting the feature enablement.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

The techniques that will be described below enable interaction between three major categories of people or entities: vendors, authors, and users. A vendor is a provider of an electronic document reader, such as Adobe Systems Incorporated. An author is someone who for a particular electronic document defines a set of usage rights, based on which features in an electronic document reader are enabled when the electronic document is read. A vendor authorizes the use of the selected features and can, optionally, charge the author for authorizing that use. A user is generally a person or an entity for whom the electronic document is intended. The user has an electronic document reader that allows him or her to receive and read the electronic document and to perform operations that are allowed by the usage rights associated with the electronic document at no cost.

An electronic document, as used herein, refers to a unit of information that can be read or otherwise processed in a computer or some type of electronic document reader. A document can contain plain or formatted text, graphics, sound, other multimedia data, or hyperlinks to other documents. An electronic document can be stored in a computer as one or more files. Often, but not necessarily, a single document is stored as a single file.

A feature can generally be described as a component of a software program (for example, an electronic document reader) that, when enabled, makes it possible to perform one or more defined operations using the software program. The operations are typically performed on data having a particular format or structure that allows the data (for example, an electronic document) to be read or otherwise operated on by the software application.

Figure 1:
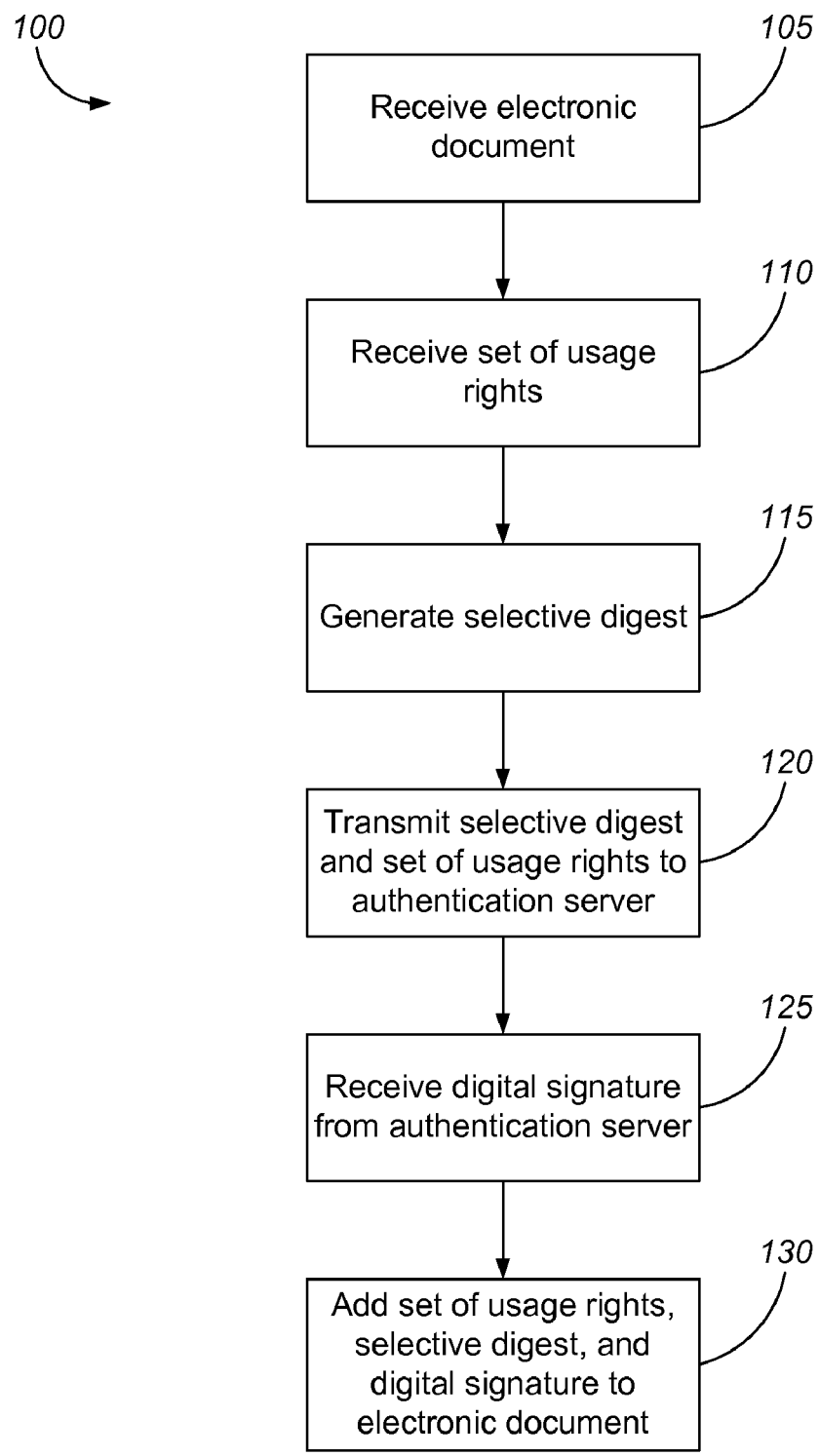
FIG. 1 is a flowchart illustrating the generation of an electronic document including a list of usage rights.

As can be seen in FIG. 1, a procedure 100 for generating an electronic document including a list of usage rights begins by receiving an electronic document (step 105). In the present example, the received electronic document is prepared in an authoring software application, such as a PDF authoring application. The electronic document can be authored by an author, that is, the same person who selects the set of features to be enabled in an electronic document reader, or it can be obtained from a different source. It should be noted that although the invention is explained by way of example, with reference to PDF documents, the techniques described apply to other types of electronic documents or data types in which instructions to an electronic document reader or data processing application can be included.

A set of usage rights is then received (step 110). The set of usage rights represents features that the author of the electronic document desires to be enabled (and that have been approved by the vendor) when a user views the electronic document in an electronic document reader. The set of usage rights can be provided by an author, or be decided automatically by the system based on the electronic document, for example, based on an agreement between the author and the vendor. The enabled features allow a user of the electronic document to perform on the electronic document the operations that are desired by the author of the electronic document. Examples of such operations include digitally signing the electronic document (in a predefined signature field), entering data into predefined fields of the electronic document (such as fill-in form fields, import/export form data in different formats), and annotating the electronic document (such as adding, deleting, editing, importing, and exporting comments or annotations). These features can be made available for the entire document or only for certain sections of the document. The set of usage rights can either be received as part of the electronic document, or be received separately from the electronic document. It should be noted that the enabled features may be a subset of the features that are normally enabled in the premium version of the software application or the electronic document reader.

Next, a selective digest is generated (step 115). The generation of the selective digest will be explained in detail below with reference to FIG. 2. In one implementation, the selective digest is represented as a hash, which acts as a fingerprint of the electronic document and thus uniquely identifies the electronic document. In another implementation the selective digest acts as a fingerprint of only one or more parts of the electronic document, and thus uniquely identifies only those specific parts of the electronic document.

In one implementation, after the set of usage rights and the selective digest have been generated, they are sent to an authentication server hosted by the vendor (step 120), for example, through the Internet. At the authentication server, the vendor determines whether the set of usage rights and selective digest are properly constructed and, optionally, whether proper payment has been received. If there are no problems, the authentication server signs the digest and set of usage rights with a private electronic key for the vendor—that is, a key known only by the vendor—and returns the signed set of usage rights and digest to the author (step 125). The electronic document reader contains a corresponding public electronic key that is supplied by the vendor and that can be used to verify that the use of the features for a particular document has been authorized by the vendor, as will be described in further detail below with respect to FIG. 3.

Finally, the author adds the set of usage rights, the digest, and the signature to the electronic document (step 130), which completes the document generating process and results in an electronic document that is ready to be provided to one or more users.

In another implementation, there is no single public/private key pair and the document is not sent to an authentication server; that is, steps 120 and 125 are not carried out. Instead, the set of usage rights and the digest are put in the document by the author, who then signs the document including the usage rights and the digest. In order for the author to be able to sign the document, the author must previously have been granted the permission from the authentication server to sign certain types of documents or documents including certain types of usage rights. One way for the author to obtain such permission is to request a digital certificate from the vendor. If the author is qualified to obtain a digital certificate, the vendor issues an encrypted digital certificate containing a public key and a variety of other identification information for the author. The vendor makes its own public key readily available in the electronic document readers, or gives users the option to download it from the Internet. When the author's signed electronic document is received in an electronic document reader, the vendor's public key is used to decode the digital certificate attached to the electronic document, verifies that the digital certificate was issued by the vendor and then opens the document. This allows the vendor to revoke the permissions for authors that do not fulfill their obligations against the vendor.

Figure 2:
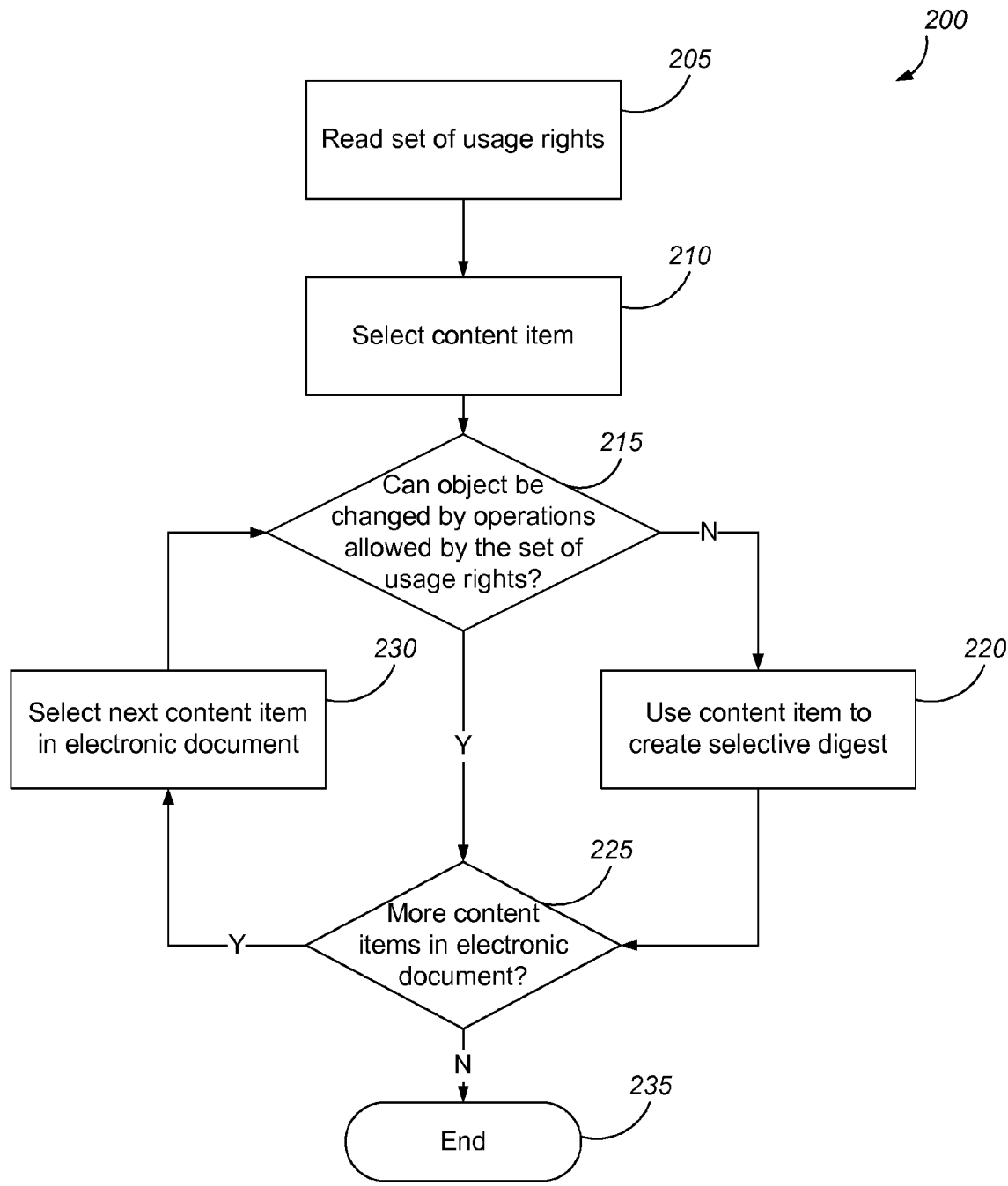
FIG. 2 is a flowchart illustrating the generation of a digest of objects that are not changeable in accordance with the usage rights.

FIG. 2 is a flowchart showing how a selective digest is generated in step 115 in FIG. 1. A digest is generally a piece of data of specific length, calculated from a file or message, in such a way that there is a high probability that any change to the original file or message will result in a change to the digest. The digest typically embodies a one-way mapping function in that is relatively easy to generate the digest from the file or message, but extremely hard to generate the message from the digest. A selective digest, as defined in this application, is a digest that is based on selected content items of an electronic document. For documents, such as PDF documents that can be described as collections of content items or objects, a selective digest is a digest that is based on some, but not necessarily all, content items of the document. In one implementation, the selective digest is based on the content items of the document that are invariant to operations performed using the features that are associated with the set of usage rights—that is, the content items that always remain the same, no matter which of the allowed operations are applied to the document. For instance, alterations of page content, addition or deletion of pages, or addition or deletion of form fields can be viewed as significant alterations to an electronic document and cause the selective digest to change. On the other hand, form fill in, addition or deletion of comments, and so on, can be viewed as superficial changes and not cause the selective digest to change. The author of an electronic document can thus, based on approval by the vendor, select a degree of flexibility to allow users to make certain authorized changes to the electronic document.

As can be seen in FIG. 2, the process 200 for generating a selective digest starts by reading the set of usage rights (step 205). The set of usage rights is used as a filter criterion when determining which objects are to be considered in the generation of the selective digest.

After the set of usage rights has been read, the process selects a content item in the document (step 210) and determines if the content item is changeable by operations of the features that are associated with the set of usage rights (step 215). If the content item cannot be changed by any of the operations associated with the set of usage rights, then the content item is included in the generation of the selective digest (step 220) and the process continues by determining whether there are any more content items in the electronic document (step 235). If it is determined in step 215 that the content item can be changed by operations allowed in the set of usage rights, then the content item is ignored and the process moves directly to step 225 without using the content item in creating the selective digest. If there are more content items in the electronic document, the process continues by selecting the next content item in the electronic document (step 230) and the process returns and performs steps 215-225 for this content item. When there are no more objects to be examined, the process ends (step 235). All the content items or objects that are considered in the generation of the selective digest described above are objects that reside in the memory of the computer or electronic document reader on which the electronic document is processed. A selective digest of this type is therefore often referred to as an object digest (as opposed to a byte range digest, which is computed by digesting bytes of a file representing an electronic document after the document has been saved to disk). A specific implementation of how a selective digest can be calculated will be described below with reference to a PDF document.

As was discussed above, one type of electronic document is a PDF document. PDF is a file format that is used to represent a document in a format that is independent of the computer software application, hardware, and operating system used to create it. A PDF file contains a PDF document and other supporting data. A PDF document can contain one or more pages. Each page in the document can contain any combination of text, graphics, and images in a device-independent and resolution-independent format. This combination is also referred to as the page description. A PDF document can also contain information possible only in an electronic representation, such as hypertext links, and so on. In addition to a document, a PDF file contains the version of the PDF specification used in the file and information about the location of different important structures in the file.

A PDF document can conceptually be thought of as having four parts. The first part is a set of basic object types used by PDF to represent content items. These object types, with only a few exceptions, correspond to the data types used in the PostScript language. Examples of such data types include Booleans, numbers, strings, names, arrays, dictionaries, and streams. The second part is the PDF file structure. The file structure determines how the content items are stored in a PDF file, how they are accessed, and how they are updated. The file structure is independent of the semantics of the content items. The third part is the PDF document structure. The document structure specifies how the basic object types are used to represent various parts of a PDF document, such as pages, annotations, hypertext links, fonts, and so on. The fourth and final part is the PDF page description. The PDF page description is a part of the PDF page object, but only has limited interaction with other parts of the PDF document. A further explanation of PDF files and documents can be found in "Portable Document Format Reference Manual" by Tom Bienz and Richard Cohn, Adobe Systems Incorporated, Addison-Wesley Publishing Company, 1993.

In one implementation, where the electronic document is a PDF document, the content items that are evaluated for inclusion/non-inclusion in the selective digest can, for example, include: MediaBox regions, CropBox regions, resource dictionaries, and the entire page content stream. In this implementation, the selective digest is represented as a hash based on the content items of the document that are invariant to user changes. The hash has a bottom layer, an intermediate layer, and a top layer. The bottom layer of the hash is a recursive algorithm and contains the functionality for digesting a basic PDF content item. Simple content items, such as Booleans, integers, numbers, strings, and names form the basis of recursion in the bottom layer algorithm. Compound content items, such as dictionaries, arrays, and so on, are digested by recursively digesting the content items making up the compound content items. Special consideration may be necessary for some types of content items, such as PDF language streams (which is a combination of a dictionary and a bit stream), but ultimately all content items are mapped to a sequence of bytes which is digested by a byte hashing algorithm. For each content item, an object type identifier is included in the digest along with the digest of the particular content item instance. For example, if the digesting algorithm encounters an integer of value 42, a type identifier corresponding to the integer type will be included in the digest along with a four byte value signifying the value 42. This makes it possible to distinguish the integer representation 42 from an identical 4 byte string, and so on.

The hashing algorithm can be a conventional hashing algorithm, such as a SHA-1 algorithm, which is a version of the Secure Hash Algorithm (SHA) and described in the ANSI X9.30 (part 2) standard. SHA-1 produces a 160-bit (20 byte) digest. Similarly, an MD5 hash algorithm, which has a 128 bit (16 byte) digest and often is a faster implementation than the SHA-1 algorithm can be used. The hashing algorithm must be capable of providing a condensed and unique representation of the invariant document content, so that the result can be used to determine whether unauthorized changes have been made to the document.

The intermediate layer of the selective hash contains the functionality for digesting semi-complex content items, such as annotations and form fields. The intermediate layer calls the bottom layer whenever necessary. For every field annotation in the PDF document, the content items can include: an annotation region, a text label for the annotation's pop-up window, a field type, a content stream of the page on which the field annotation resides, a normal appearance stream, a default field value, and if form rights are turned off, an actual field value. PDF form field content items have associated annotation content items. The form field content items are therefore digested by including selected elements from the annotation as well as the field dictionary.

The top layer of the selective hash contains the functionality for digesting complex content items, such as pages or an entire PDF document. A PDF page is digested by digesting selected elements from the associated page dictionary. A page template is digested by including a content stream of the page template, and optionally annotations on the page template. An entire PDF document is digested by digesting all the pages, all the form fields, and all page templates, if available.

A few further considerations arise when the hash forming the selective digest of a PDF document is generated, as will now be described. First, in order to avoid infinite recursions, the process 200 for creating the selective digest keeps track of all indirect content items visited during a recursive descent into each content item. The process 200 does not recurse on an indirect content item that has already been visited once. If an already visited content item is encountered, the process 200 merely adds the object type and a fixed integer into the selective digest to indicate that the content item was encountered again.

Second, if form fill-in is allowed, the content of a value field in a field dictionary of the PDF document is never included in the selective digest, since this value would be modified during form fill-in. However, if form fill-in is not allowed, or if some form fields are present before the digest is present and the author may wish to lock these form fields, the content of the value field in the field dictionary of the PDF document is included in the selective digest, so that the form fields cannot be changed. In one implementation, it is also possible to select which form fields to include in the selective digest, such that some form fields can be changed while others must remain unchanged. The same is true for the content stream of the widget annotation corresponding to a field.

Figure 3:
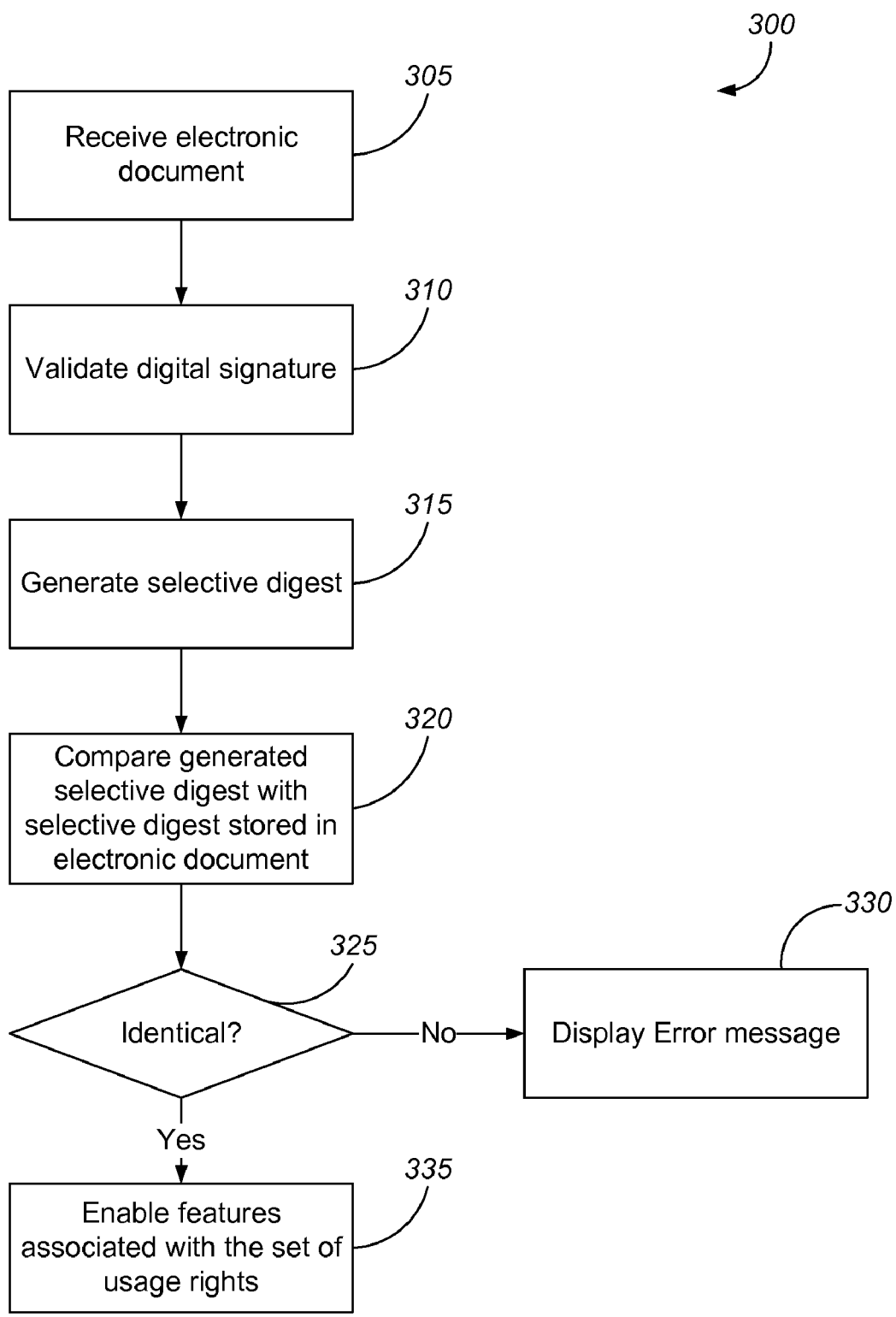
FIG. 3 is a flowchart illustrating enabling features in an electronic document reader.

FIG. 3 shows a process 300 for enabling features in an electronic document reader. The process starts when an electronic document that includes content items, a list of enabled features, a selective digest, and a signature are received (step 305). The electronic document can be received by any type of conventional means, such as through a network as e-mail or be downloaded to a user's computer. Alternatively, the electronic document can be stored on some type of carrier for digital data, such as a floppy disk or a CD.

When the document has been received, the electronic document reader validates the signature (step 310). In one implementation, the validation is performed using a public key that is provided by the vendor in the electronic document reader. The public key corresponds to the private key that the vendor used to sign the set of usage rights and selective digest. The validation establishes that the set of usage rights and the selective digests have not been tampered with and that they are authorized by the vendor.

The electronic document reader then generates a new selective digest of the electronic document (step 315). The generation is performed in the same manner as described above with reference to FIG. 2, with the set of usage rights included in the document as a content filtering guide.

The new selective digest is compared with the signed selective digest that is stored in the electronic document (step 320). The new selective digest and the stored selective digest will be identical only if the signed selective digest was generated from an electronic document that includes invariant content items that are identical to those of the current electronic document—that is, if the content items of the document identified as being invariant to operations of the enabled features have not been modified since the original selective digest was generated, signed, and stored. If the new selective digest and the stored selective digest are identical (the yes branch of step 325), the electronic document reader enables the features described in the set of usage rights (step 335) in the electronic document and operations provided by those features can be used on the electronic document reader. If it is found that the new selective digest and the stored selective digest are not identical (the no branch of step 325), an error message is displayed (step 330), and no features other than the standard limited set of features of the electronic document reader can be used.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. Steps need not be performed in the order described above. While the examples above describe the enablement of features for an entire electronic document, in alternative implementations, features can be enabled for only specific content items in the document. Also, the features discussed above are merely examples of features that are useful in workflows for PDF documents. Other features can be enabled or disabled for other types of documents, using techniques similar to these presented above. Accordingly, other embodiments are within the scope of the following claims.

What is claimed is:

1. A method for enabling one or more operations in an electronic document reader, comprising:

receiving an electronic document, the electronic document including one or more invariant content items, one or more modifiable content items, a set of usage rights defining one or more operations to be enabled when the document is read by an electronic document reader, and a stored representation, the one or more operations, when enabled, modifying at least a part of the electronic document;

generating a current representation of the invariant content items of the electronic document, the generating comprising digesting the one or more invariant content items according to their complexity, wherein digesting the one or more invariant content items comprises recursively digesting the one or more invariant content items, wherein the invariant content items are organized in a layered structure within the electronic document;

determining that the current representation and the stored representation are identical; and based on the determining, enabling the one or more operations features corresponding to the set of usage rights in the electronic document.

2. The method of claim 1, wherein the electronic document contains an encrypted authorization of the stored representation, the method further comprising:

verifying the encrypted authorization.

3. The method of claim 1, wherein:

the one or more operations modify the electronic document using the electronic document reader.

4. The method of claim 3, wherein:

the operations include one or more of: digitally signing the electronic document, entering data into predefined fields of the electronic document, annotating the electronic document, saving field values, and saving the electronic document.

5. The method of claim 1, wherein:

the electronic document is a Portable Document Format document and the set of usage rights is represented as a dictionary.

6. The method of claim 1, wherein:

the layered structure comprises a layer of complex content items, a layer of semi-complex content items, and a layer of basic content items.

7. A computer program product, tangibly stored on a machine-readable medium, for enabling one or more operations in an electronic document reader, comprising instructions operable to cause a programmable processor to:

receiving an electronic document, the electronic document including one or more invariant content items, one or more modifiable content items, a set of usage rights defining one or more operations to be enabled when the document is read by an electronic document reader, and a stored representation, the one or more operations, when enabled, modifying at least a part of the electronic document;

generating a current representation of the invariant content items of the electronic document, the generating comprising digesting the one or more invariant content items according to their complexity, wherein digesting the one or more invariant content items comprises recursively digesting the one or more invariant content items wherein the invariant content items are organized in a layered structure internal to the electronic document;

determining that the current representation and the stored representation are identical; and based on the determining, enabling the one or more operations features corresponding to the set of usage rights in the electronic document.

8. The computer program product of claim 7, wherein the electronic document contains an encrypted authorization of the stored representation, further comprising instructions to:
verify the encrypted authorization.

9. The computer program product of claim 7, wherein:
the one or more operations modify the electronic document using the electronic document reader.

10. The computer program product of claim 9, wherein:
the operations include one or more of: digitally signing the electronic document, entering data into predefined fields of the electronic document, annotating the electronic document, saving field values, and saving the electronic document.

11. The computer program product of claim 7, wherein:
the electronic document is a Portable Document Format document and the set of usage rights is represented as a dictionary.

12. The computer program product of claim 7, wherein:
the layered structure comprises a layer of complex content items, a layer of semi-complex content items, and a layer of basic content items.

13. An electronic document reader, comprising:
means for receiving an electronic document containing one or more content items, a set of usage rights defining one or more operations to be enabled when the electronic document is processed in an electronic document reader, and a stored representation, the one or more operations, when enabled, modifying at least a part of the electronic document;

means for generating a representation that represents invariant content items of the electronic document, the generating comprising digesting the one or more invariant content items according to their complexity, wherein digesting the one or more invariant content items comprises recursively digesting the one or more invariant content items wherein the invariant content items are organized in a layered structure internal to the electronic document;

means for comparing the generated representation with the stored representation; and means for enabling features corresponding to the set of usage rights in the electronic document only if the generated representation and the stored representation are identical, the features being features performed by the electronic document reader on the electronic document.

14. The electronic document reader of claim 13, wherein the electronic document contains an encrypted authorization of the stored representation, and the electronic document reader further comprises:
means for verifying the encrypted authorization.

15. The electronic document reader of claim 13, wherein:
the one or more of the operations modify the electronic document using the electronic document reader.

16. The electronic document reader of claim 15, wherein:
the operations include one or more of: digitally signing the electronic document, entering data into predefined fields of the electronic document, annotating the electronic document, saving field values, and saving the electronic document.

17. The electronic document reader of claim 13, wherein:
the electronic document is a Portable Document Format document and the set of usage rights is represented as a dictionary.

18. The electronic document reader of claim 13, wherein:
the layered structure comprises a layer of complex content items, a layer of semi-complex content items, and a layer of basic content items.

19. A system comprising a computer readable storage device storing a computer program, a display device, and one or more processors operable to interact with the display device and to execute the computer program and perform actions comprising:
receiving an electronic document, the electronic document including one or more invariant content items, one or more modifiable content items, a set of usage rights defining one or more operations to be enabled when the document is read by an electronic document reader, and a stored representation, the one or more operations, when enabled, modifying at least a part of the electronic document;

generating a current representation of the invariant content items of the electronic document, the generating comprising digesting the one or more invariant content items according to their complexity, wherein digesting the one or more invariant content items comprises recursively digesting the one ore more invariant content items organized in a layered structure internal to the electronic document;

determining that the current representation and the stored representation are identical; and based on the determining, enabling the one or more operations corresponding to the set of usage rights in the electronic document.

20. The system of claim 19, wherein the electronic document contains an encrypted authorization of the stored representation, the method further comprising:
verifying the encrypted authorization.

21. The system of claim 19, wherein:
the one or more of the operations modify the electronic document using the electronic document reader.

22. The system of claim 21, wherein:
the operations include one or more of: digitally signing the electronic document, entering data into predefined fields of the electronic document, annotating the electronic document, saving field values, and saving the electronic document.

23. The system of claim 19, wherein:
the electronic document is a Portable Document Format document and the set of usage rights is represented as a dictionary.

24. The system of claim 19, wherein:
the layered structure comprises a layer of complex content items, a layer of semi-complex content items, and a layer of basic content items.

* * * * *